United States Patent
Krogerus

(10) Patent No.: US 9,813,103 B2
(45) Date of Patent: Nov. 7, 2017

(54) ENHANCED MULTI-BAND MULTI-FEED ANTENNAS AND A WIRELESS COMMUNICATION APPARATUS

(71) Applicant: Microsoft Technology Licensing, LLC, Redmond, WA (US)

(72) Inventor: Joonas Krogerus, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/854,570

(22) Filed: Sep. 15, 2015

(65) Prior Publication Data
US 2017/0077604 A1    Mar. 16, 2017

(51) Int. Cl.
| H01Q 1/38 | (2006.01) |
|---|---|
| H04B 1/40 | (2015.01) |
| H01Q 1/24 | (2006.01) |
| H01Q 1/48 | (2006.01) |
| H01Q 21/28 | (2006.01) |

(Continued)

(52) U.S. Cl.
CPC .............. *H04B 1/40* (2013.01); *H01Q 1/243* (2013.01); *H01Q 1/48* (2013.01); *H01Q 5/35* (2015.01); *H01Q 21/28* (2013.01); *H01Q 5/10* (2015.01); *H01Q 9/30* (2013.01)

(58) Field of Classification Search
CPC ....................................................... H01Q 1/38
See application file for complete search history.

(56) References Cited

U.S. PATENT DOCUMENTS

| 7,187,959 B2 | 3/2007 | Ponce De Leon et al. |
|---|---|---|
| 9,142,879 B2 * | 9/2015 | Galeev ..................... H01Q 5/35 |

(Continued)

FOREIGN PATENT DOCUMENTS

| EP | 2608315 A1 | 6/2013 |
|---|---|---|
| EP | 2731194 A1 | 5/2014 |

(Continued)

OTHER PUBLICATIONS

Lee, et al., "Closely Mounted Mobile Handset MIMO Antenna for LTE 13 Band Application", In Proceedings of IEEE Antennas and Wireless Propagation Letters, vol. 13, Feb. 20, 2014, pp. 411-414.

(Continued)

*Primary Examiner* — Tuan H Nguyen

(57) ABSTRACT

In one example, a multi-band multi-feed antenna comprises a first conductive end portion having a first antenna feed point located in a substantially middle area of the first conductive end portion; a second conductive end portion having a second antenna feed point located in a substantially middle area of the second conductive end portion; a conductive middle portion configured between the first and second conductive end portions; a first lower ground member at a first corner area of the first conductive end portion, configured to interconnect the first conductive end portion and a ground plane of the conductive middle portion; and a second upper ground member at a second corner area of the second conductive end portion, configured to interconnect the second conductive end portion and the ground plane. The first lower ground member and the second upper ground member are configured at substantially diagonally opposite positions.

20 Claims, 8 Drawing Sheets

(51) Int. Cl.
*H01Q 5/35* (2015.01)
*H01Q 5/10* (2015.01)
*H01Q 9/30* (2006.01)

(56) References Cited

U.S. PATENT DOCUMENTS

| | | | |
|---|---|---|---|
| 9,379,433 B2* | 6/2016 | Ying | H01Q 1/48 |
| 2008/0122698 A1 | 5/2008 | Ollikainen et al. | |
| 2010/0111143 A1 | 5/2010 | Nishikido et al. | |
| 2013/0141305 A1 | 6/2013 | Leem | |
| 2013/0154886 A1 | 6/2013 | Isohatala | |
| 2013/0194156 A1* | 8/2013 | Iellici | H01Q 1/2275 343/867 |
| 2013/0234907 A1* | 9/2013 | Yoo | H01Q 1/50 343/846 |
| 2013/0241793 A1 | 9/2013 | Ai et al. | |
| 2014/0062801 A1 | 3/2014 | Yong et al. | |
| 2014/0141731 A1 | 5/2014 | Abudul-Gaffoor et al. | |
| 2014/0292593 A1* | 10/2014 | Thiam | H01Q 1/3275 343/713 |
| 2015/0009075 A1 | 1/2015 | Lau et al. | |

FOREIGN PATENT DOCUMENTS

| | | |
|---|---|---|
| WO | 2013064872 A1 | 5/2013 |
| WO | 2015007952 A1 | 1/2015 |

OTHER PUBLICATIONS

Li, et al., "WAN Antenna Design for Mobile Phone with Closed Metal Frame", In Proceedings of IEEE Antennas and Propagation Society International Symposium, Jul. 6, 2014, pp. 281-282.

Mun, et al., "New Configuration of Handset MIMO Antenna for LTE 700 Band Applications", In International Journal of Antennas and Propagation, Jul. 31, 2013, 3 pages.

Zhang, et al., "Reduction of the Envelope Correlation Coefficient With Improved Total Efficiency for Mobile LTE MIMO Antenna Arrays: Mutual Scattering Mode", In Proceedings of IEEE Transactions on Antennas and Propagation, vol. 61, Issue 6, Feb. 22, 2013, pp. 3280-3291.

Li, et al., "Printed Multi-band Slot Antenna Surrounded by a Metal Ring for WWAN Smartphone Applications", In Proceedings of Progress in Electromagnetics Research Symposium in Guangzhou, Aug. 25, 2014, pp. 2198-2200.

"International Search Report and Written Opinion Issued in PCT Application No. PCT/US2016/045665", dated Nov. 7, 2016, 13 Pages.

"Second Written Opinion Issued in PCT Application No. PCT/US2016/045665", dated Mar. 16, 2017, 7 Pages.

* cited by examiner

ENHANCED MULTI-BAND MULTI-FEED ANTENNAS AND A WIRELESS COMMUNICATION APPARATUS

BACKGROUND

Metal covers are becoming common in various mobile communication apparatuses, such as cellular phones, smartphones and tablet computers. As a result, there may be instances when a multi-band multi-feed antenna does not achieve low enough correlation between antenna signals, especially at cellular communications frequency bands below 1 GHz, e.g. at LTE low bands because the metal covers increase the correlation between the antenna signals.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one example, a multi-band multi-feed antenna comprises a first conductive end portion having a first antenna feed point located in a substantially middle area of the first conductive end portion; a second conductive end portion having a second antenna feed point located in a substantially middle area of the second conductive end portion; a conductive middle portion configured between the first and second conductive end portions and having a ground plane; a first lower ground member at a first corner area of the first conductive end portion, configured to interconnect the first conductive end portion and the ground plane of the conductive middle portion; and a second upper ground member at a second corner area of the second conductive end portion, configured to interconnect the second conductive end portion and the ground plane of the conductive middle portion, wherein the first lower ground member and the second upper ground member are configured at substantially diagonally opposite positions.

In another example, another multi-band multi-feed antenna and a wireless communication apparatus have been discussed along with the features of the multi-band multi-feed antenna.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
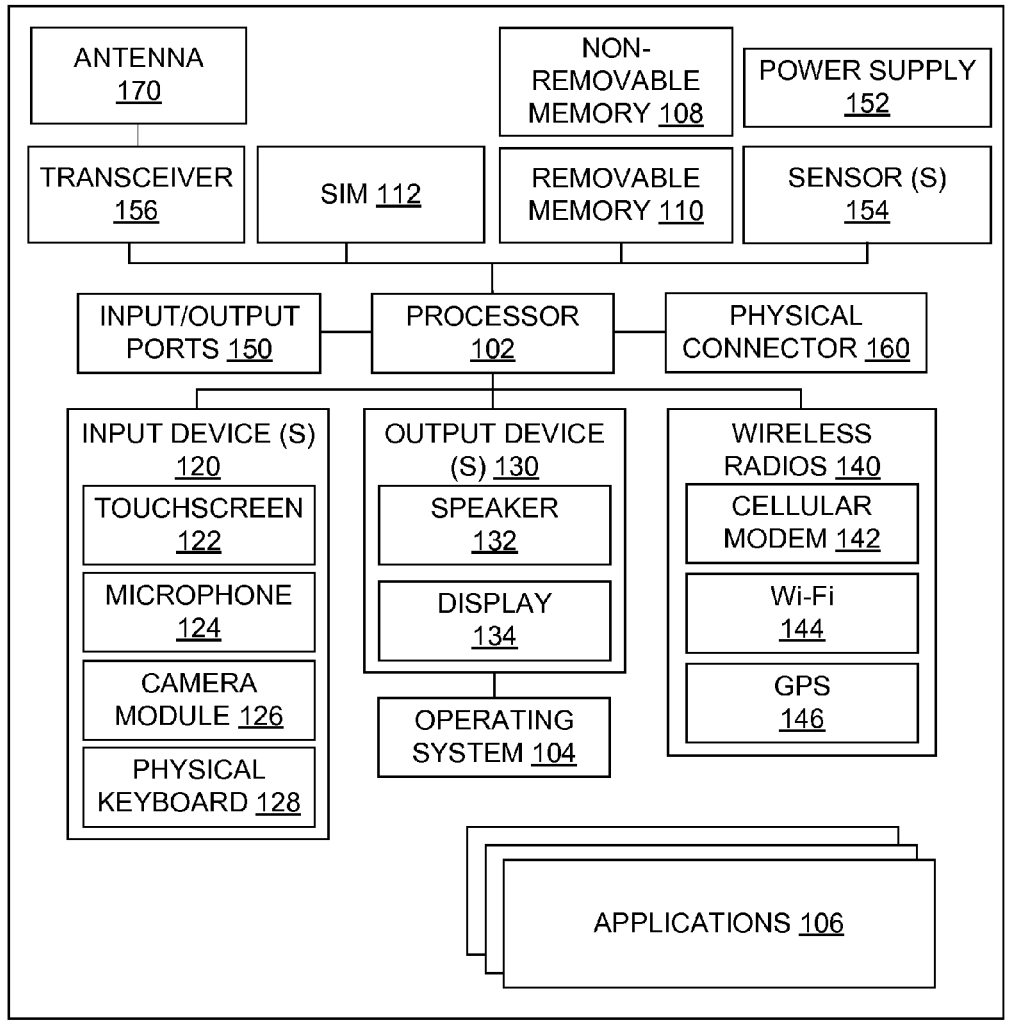
FIG. 1 illustrates an example of an apparatus capable of implementing example embodiments described herein.

FIG. 1 is a schematic block diagram of an apparatus 100 capable of implementing embodiments of the techniques described herein. It should be understood that the apparatus 100 as illustrated and hereinafter described is merely illustrative of one type of apparatus or an electronic device and should not be taken to limit the scope of the embodiments. As such, it should be appreciated that at least some of the components described below in connection with the apparatus 100 may be optional and thus in an example embodiment may include more, less or different components than those described in connection with the example embodiment of FIG. 1. As such, among other examples, the apparatus 100 could be any of wireless communication apparatuses, for example, mobile phones, a smartphones, tablet computers, mobile digital assistants, wearable communication apparatuses (such as smartwatches and the like) or any combination of the aforementioned, and other types of communication apparatuses, e.g. those incorporating a multi-band multi-feed antenna.

The illustrated apparatus 100 includes a controller or a processor 102 (i.e.—a signal processor, microprocessor, ASIC, or other control and processing logic circuitry) for performing such tasks as signal coding, data processing, input/output processing, power control, and/or other functions. An operating system 104 controls the allocation and usage of the components of the apparatus 100 and support for one or more application programs 106. In addition, the application programs 106 can include common mobile applications, for instance, telephony applications, email applications, calendars, contact managers, web browsers, messaging applications, or any other application.

The illustrated apparatus 100 includes one or more memory components, for example, a non-removable memory 108 and/or removable memory 110. The non-removable memory 108 can include RAM, ROM, flash memory, a hard disk, or other well-known memory storage technologies. The removable memory 110 can include flash memory or smart cards. The one or more memory components can be used for storing data and/or code for running the operating system 104 and the applications 106. Example of data can include web pages, text, images, sound files, image data, video data, or other data sets to be sent to and/or received from one or more network servers or other devices via one or more wired or wireless networks. The electronic device 100 may further include a subscriber identity module (SIM) 112. The SIM 112 typically stores information elements related to a mobile subscriber. A SIM is well known in Global System for Mobile Communications (GSM) communication systems, Code Division Multiple Access (CDMA) systems, or with third-generation (3G) wireless communication protocols such as Universal Mobile Telecommunications System (UMTS), CDMA1000, wideband CDMA (WCDMA) and time division-synchronous CDMA (TD-SCDMA), or with fourth-generation (4G) wireless communication protocols such as LTE (Long-Term Evolution) wireless standard. Herein, LTE and 'long-term evolution' and 'long term evolution' are used to refer to the Long-Term Evolution wireless standard.

The apparatus 100 can support one or more input devices 120 and one or more output devices 130. Examples of the input devices 120 may include, but are not limited to, a touchscreen 122 (i.e., capable of capturing finger tap inputs, finger gesture inputs, multi-finger tap inputs, multi-finger gesture inputs, or keystroke inputs from a virtual keyboard or keypad), a microphone 124 (i.e., capable of capturing voice input), a camera module 126 (i.e., capable of capturing still picture images and/or video images) and a physical keyboard 128. Examples of the output devices 130 may include, but are not limited to a speaker 132 and a display 134. Other possible output devices (not shown) can include piezoelectric or other haptic output devices. Some devices can serve more than one input/output function. For example, the touchscreen 122 and the display 134 can be combined into a single input/output device.

In an embodiment, the apparatus 100 may comprise a wireless radio(s) 140. The wireless radio(s) 140 can be coupled to one or more antennas arrangements 170 and can support two-way communications between the processor 102 and external devices, as is well understood in the art. The wireless radio(s) 140 are shown generically and can include, for example, a cellular modem 142 for communicating at long range with the mobile communication network, a Wi-Fi radio 144 for communicating at short range with a local wireless data network or router, and/or a Global Positioning System (GPS) radio 146. The cellular modem 142 is typically configured for communication with one or more cellular networks, such as a GSM/3G network for data and voice communications within a single cellular network, between cellular networks, or between the mobile device and a public switched telephone network (PSTN).

The apparatus 100 can further include one or more input/output ports 150, a power supply 152, one or more sensors 154 for example, an accelerometer, a gyroscope, a compass, or an infrared proximity sensor for detecting the orientation or motion of the electronic device 100, a transceiver 156 (for wirelessly transmitting analog or digital signals) and/or a physical connector 160, which can be e.g. a USB port, IEEE 1394 (FireWire) port, and/or RS-232 port. The illustrated components are not required or all-inclusive, as any of the components shown can be deleted and other components can be added.

Figure 2:
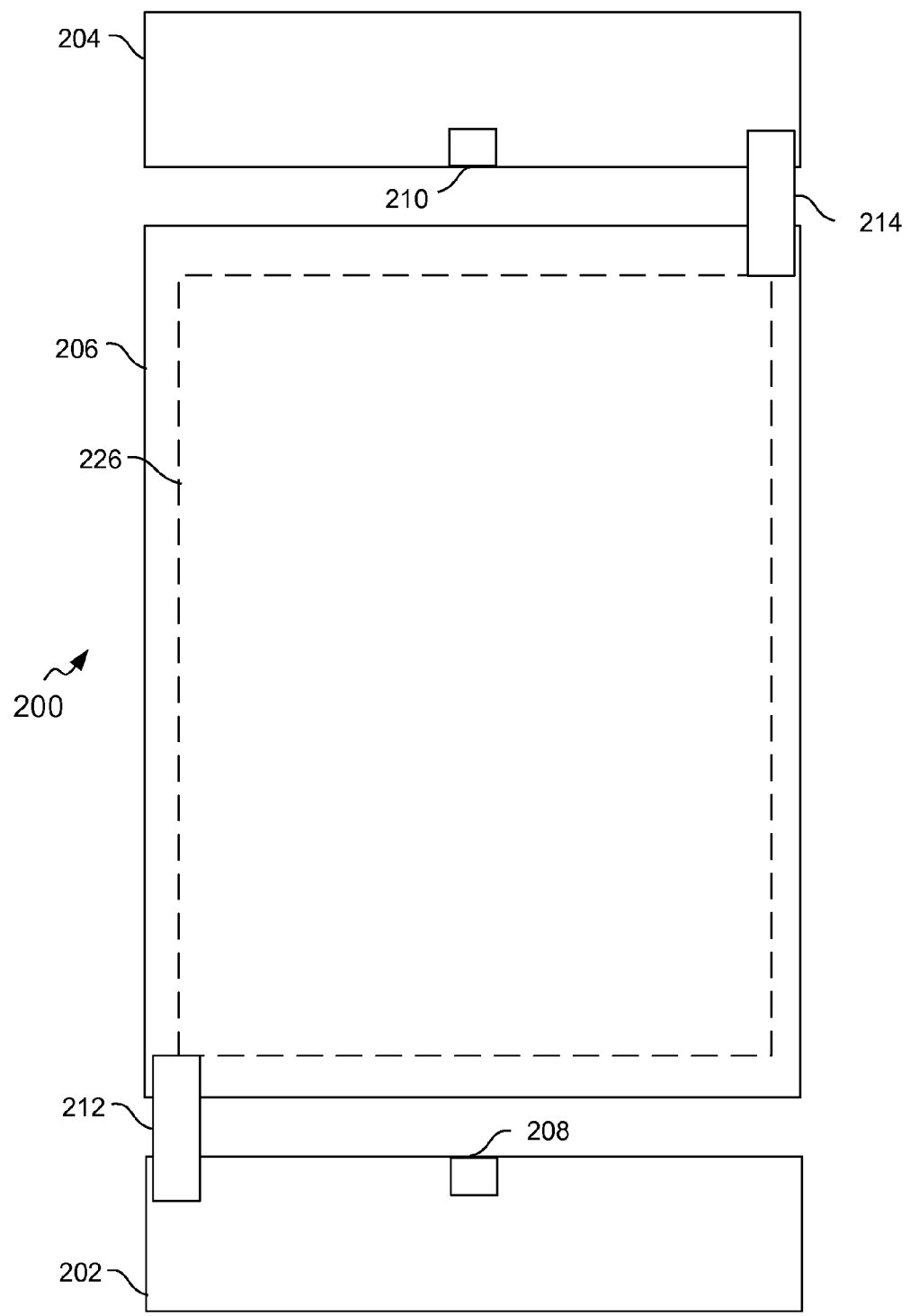
FIG. 2 is an example block diagram of a multi-band multi-feed antenna in accordance with an example embodiment.

FIG. 2 illustrates a multi-band multi-feed antenna 200 in accordance with an example embodiment. The multi-band multi-feed antenna 200 may be employed, for example, in the apparatus 100 of FIG. 1. However, it should be noted that the antenna 200 may also be employed on a variety of other apparatuses, and therefore, embodiments should not be limited to application on apparatuses such as the apparatus 100 of FIG. 1. Furthermore, it should be noted that at least some of the elements described below may not be mandatory and thus some may be omitted in certain embodiments.

The multi-band multi-feed antenna 200 comprises a first conductive (e.g. metal) end portion 202 that has a first antenna feed point 208 located in a substantially middle area of the first conductive end portion 202. The multi-band multi-feed antenna 200 further comprises a second conductive (e.g. metal) end portion 204 that has a second antenna feed point 210 located in a substantially middle area of the second conductive end portion 204. The multi-band multi-feed antenna 200 further comprises a conductive (e.g. metal) middle portion 206 that is configured between the first and second conductive end portions and has a ground plane 226. The multi-band multi-feed antenna 200 further comprises a first lower ground member 212 at a first corner area of the first conductive end portion 202. The first lower ground member 212 is configured to interconnect the first conductive end portion 202 and the ground plane 226 of the conductive middle portion 206. The multi-band multi-feed antenna 200 further comprises a second upper ground member 214 at a second corner area of the second conductive end portion 204. The second upper ground member 214 is configured to interconnect the second conductive end portion 204 and the ground plane 226 of the conductive middle portion 206. The first lower ground member 212 and the second upper ground member 214 are configured at substantially diagonally opposite positions.

It is to be understood that while the first lower ground member 212 is illustrated to be located in the left corner area of the first conductive end portion 202 and the second upper ground member 214 is illustrated to be located in the right corner area of the second conductive end portion 204 in the example embodiment of FIG. 2, in another example embodiment the first lower ground member 212 may be located in the right corner area of the first conductive end portion 202 and the second upper ground member 214 may be located in the left corner area of the second conductive end portion 204, such that the first lower ground member 212 and the second upper ground member 214 are still configured at substantially diagonally opposite positions.

At least one of the first antenna feed point 208 and the second antenna feed point 210 may comprise a long term evolution (LTE) antenna feed point. The long term evolution antenna feed point may comprise a long term evolution low band (LB) antenna feed point. The LTE LB may comprise frequencies substantially in the range 698-960 MHz. The first antenna feed point 208 may be configured for a main LTE antenna. The second antenna feed point 210 may be configured for a MIMO (multiple-input and multiple-output) LTE antenna.

Figure 3:
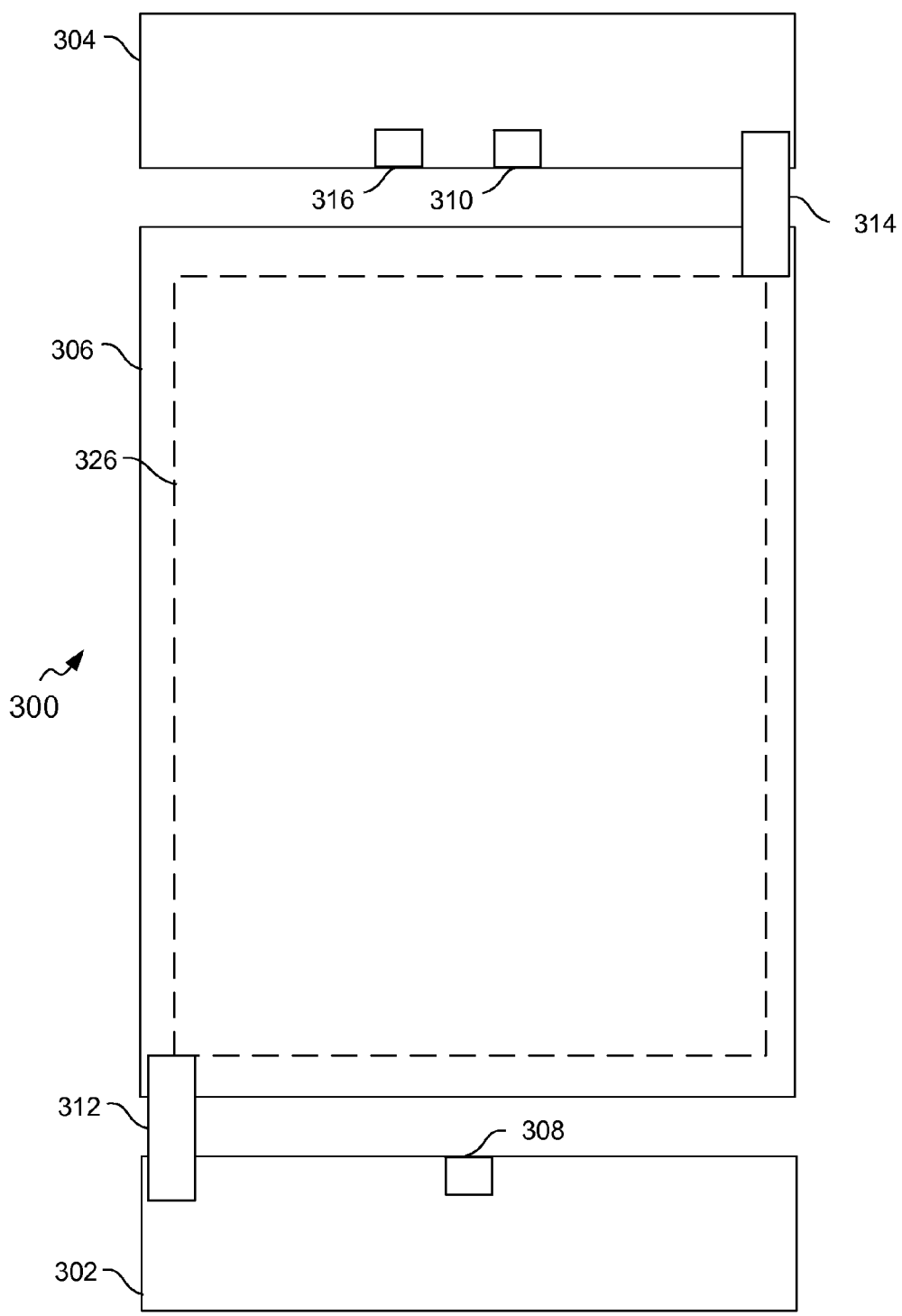
FIG. 3 is an example block diagram of a multi-band multi-feed antenna in accordance with an example embodiment.

FIG. 3 illustrates a multi-band multi-feed antenna 300 in accordance with an example embodiment. The multi-band multi-feed antenna 300 may be employed, for example, in the apparatus 100 of FIG. 1. However, it should be noted that the antenna 300 may also be employed on a variety of other apparatuses, and therefore, embodiments should not be limited to application on apparatuses such as the apparatus 100 of FIG. 1. Furthermore, it should be noted that at least some of the elements described below may not be mandatory and thus some may be omitted in certain embodiments.

In the example of FIG. 3, the functionalities and locations of the first conductive end portion 302, the second conductive end portion 304, the conductive middle portion 306 and its ground plane 326, the first antenna feed point 308, the second antenna feed point 310, the first lower ground member 312, and the second upper ground member 314 are substantially similar to those of their counterparts in the example of FIG. 2, so their descriptions are not repeated here in detail. In the example of FIG. 3, the multi-band multi-feed antenna 300 further comprises an ancillary antenna feed point 316. In the example of FIG. 3, the ancillary antenna feed point 316 is located in the substantially middle area of the second conductive end portion 304.

The ancillary antenna feed point 316 may comprise a long term evolution middle band (MB) antenna feed point or a long term evolution high band (HB) antenna feed point. The LTE LB may comprise frequencies substantially in the range 698-960 MHz. The LTE MB may comprise frequencies substantially in the range above 1710-2170 MHz. The LTE HB may comprise frequencies substantially in the range above 2300-2690 MHz. Alternatively, the ancillary antenna feed point 316 may comprise a non-cellular wireless system antenna feed point. The non-cellular wireless system may comprise at least one of a wireless local area network (WLAN) system and a global positioning system (GPS).

The ancillary antenna feed point 316 may be implemented e.g. as a direct PWB antenna feed, capacitive feed or a suitable galvanic feed.

Figure 4:
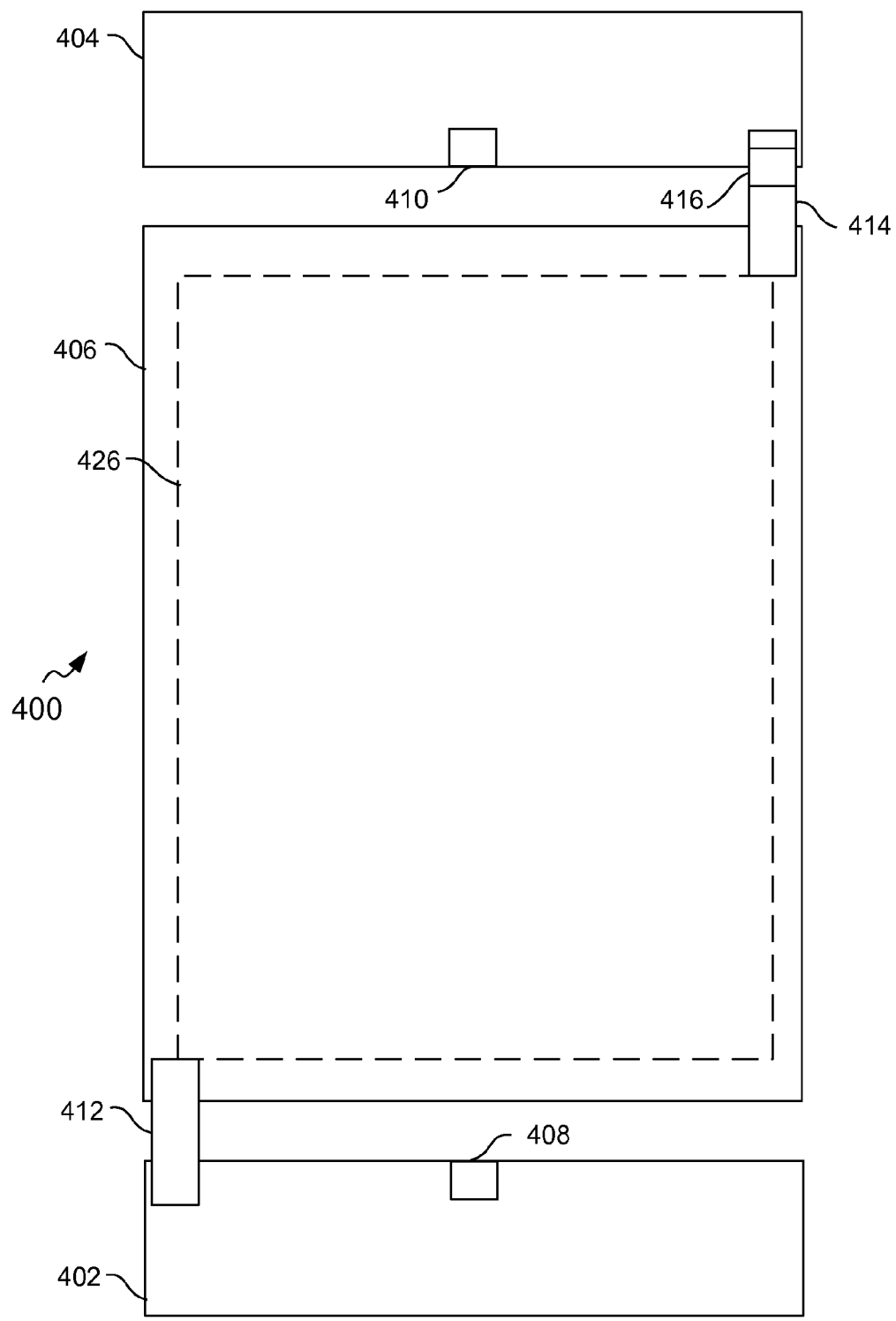
FIG. 4 is an example block diagram of a multi-band multi-feed antenna in accordance with an example embodiment.

FIG. 4 illustrates a multi-band multi-feed antenna 400 in accordance with an example embodiment. The multi-band multi-feed antenna 400 may be employed, for example, in the apparatus 100 of FIG. 1. However, it should be noted that the antenna 400 may also be employed on a variety of other apparatuses, and therefore, embodiments should not be limited to application on apparatuses such as the apparatus 100 of FIG. 1. Furthermore, it should be noted that at least some of the elements described below may not be mandatory and thus some may be omitted in certain embodiments.

In the example of FIG. 4, the functionalities and locations of the first conductive end portion 402, the second conductive end portion 404, the conductive middle portion 406 and its ground plane 426, the first antenna feed point 408, the second antenna feed point 410, and the first lower ground member 412 are substantially similar to those of their counterparts in the example of FIG. 2, so their descriptions are not repeated here in detail.

The multi-band multi-feed antenna 400 further comprises a second upper ground member 414 at a second corner area of the second conductive end portion 404. The second upper ground member 414 is configured to interconnect the second conductive end portion 404 and the ground plane 426 of the conductive middle portion 406. The first lower ground member 412 and the second upper ground member 414 are configured at substantially diagonally opposite positions. In the example of FIG. 4, the multi-band multi-feed antenna 400 further comprises an ancillary antenna feed point 416. Further in the example of FIG. 4, the ancillary antenna feed point 416 is integrated with the second upper ground member 414. The ancillary antenna feed point 416 may comprise a long term evolution middle band (MB) antenna feed point or a long term evolution high band (HB) antenna feed point. Alternatively, the ancillary antenna feed point 416 may comprise a non-cellular wireless system antenna feed point. The non-cellular wireless system may comprise at least one of a wireless local area network (WLAN) system and a global positioning system (GPS). The integration of the ancillary antenna feed point 416 and the second upper ground member 414 may be implemented utilizing a matching circuit designed to have filter like response, such that below substantially 1.4 GHz it will have effectively a short-circuit like response and above substantially 1.4 GHz it will work as a matching circuit to provide the matching functionality for 1.7-2.7 GHz.

Figure 5:
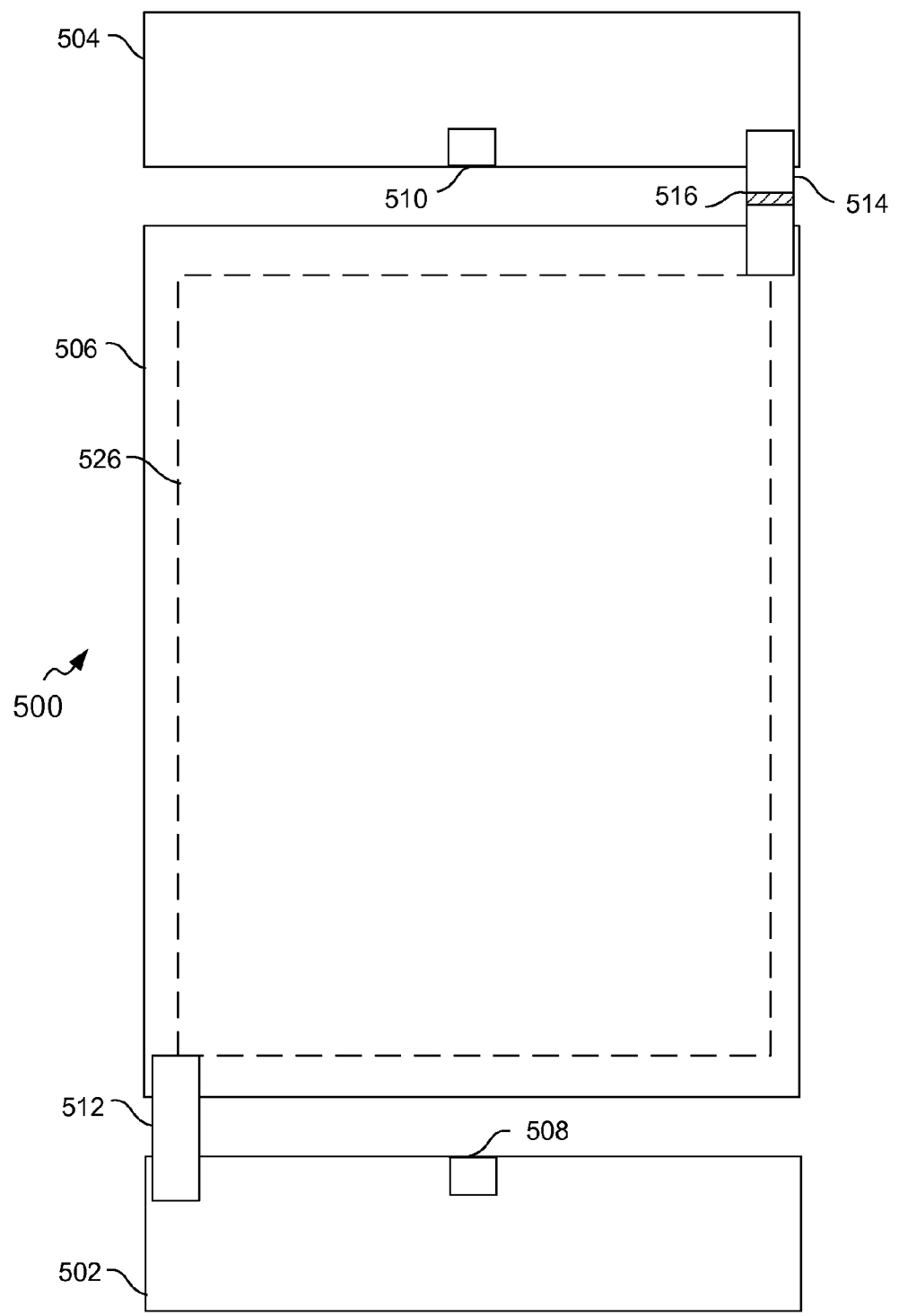
FIG. 5 is an example block diagram of a multi-band multi-feed antenna in accordance with an example embodiment.

FIG. 5 illustrates a multi-band multi-feed antenna 500 in accordance with an example embodiment. The multi-band multi-feed antenna 500 may be employed, for example, in the apparatus 100 of FIG. 1. However, it should be noted that the antenna 500 may also be employed on a variety of other apparatuses, and therefore, embodiments should not be limited to application on apparatuses such as the apparatus 100 of FIG. 1. Furthermore, it should be noted that at least some of the elements described below may not be mandatory and thus some may be omitted in certain embodiments.

In the example of FIG. 5, the functionalities and locations of the first conductive end portion 502, the second conductive end portion 504, the conductive middle portion 506 and its ground plane 526, the first antenna feed point 508, the second antenna feed point 510, and the first lower ground member 512 are substantially similar to those of their counterparts in the example of FIG. 2, so their descriptions are not repeated here in detail.

The multi-band multi-feed antenna 500 further comprises a second upper ground member 514 at a second corner area of the second conductive end portion 504. The second upper ground member 514 is configured to interconnect the second conductive end portion 504 and the ground plane 526 of the conductive middle portion 506. The first lower ground member 512 and the second upper ground member 514 are configured at substantially diagonally opposite positions. In the example of FIG. 5, the second upper ground member 514 comprises a frequency selective filter element 516. The frequency selective filter element 516 may comprise a low pass type filter, such that for bands substantially below 1 GHz the frequency selective filter element 516 gives a nearly short-circuit response, and for bands substantially above 1.4 GHz it gives an open circuit response.

Figure 6:
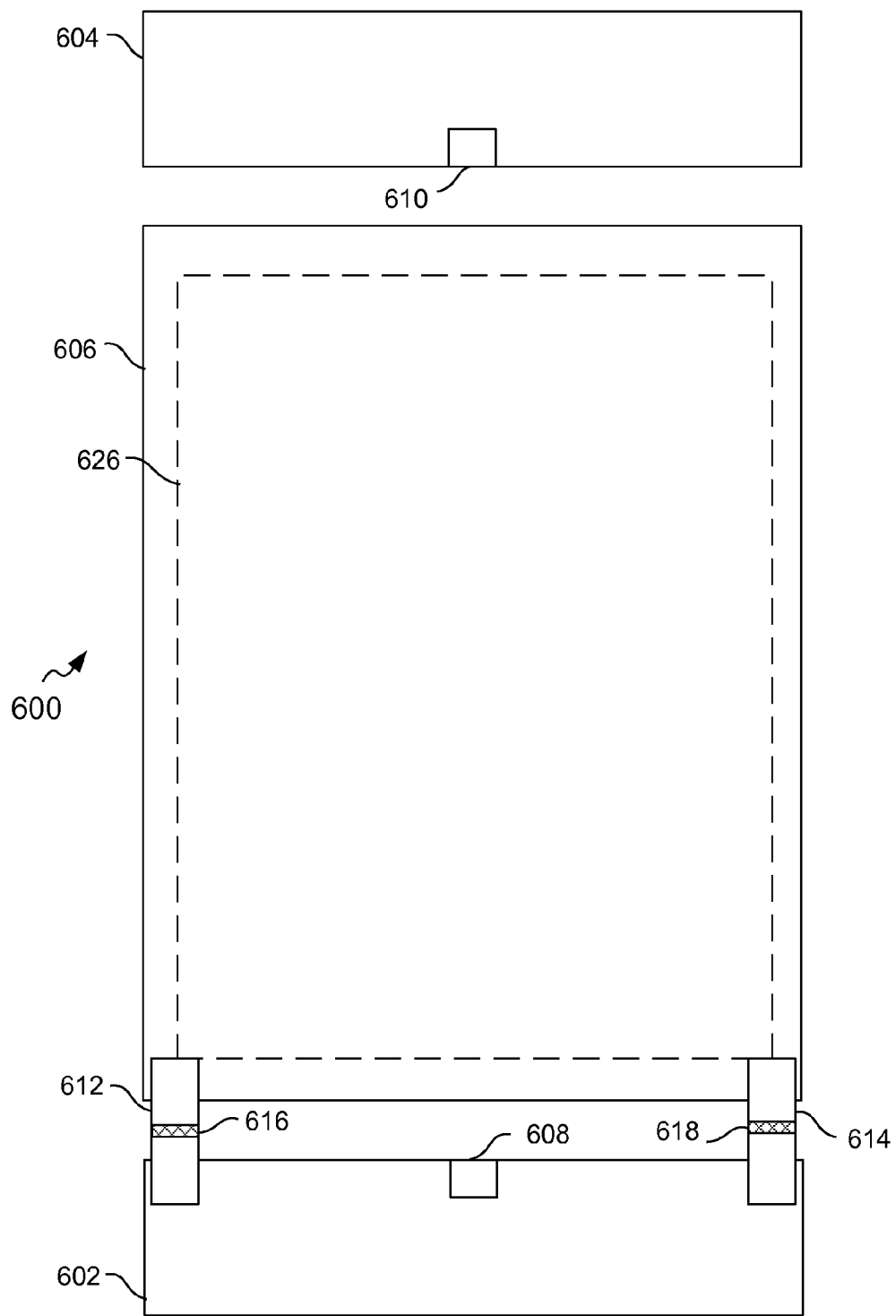
FIG. 6 is an example block diagram of a multi-band multi-feed antenna in accordance with an example embodiment.

FIG. 6 illustrates a multi-band multi-feed antenna 600 in accordance with an example embodiment. The multi-band multi-feed antenna 600 may be employed, for example, in the apparatus 100 of FIG. 1. However, it should be noted that the antenna 600 may also be employed on a variety of other apparatuses, and therefore, embodiments should not be limited to application on apparatuses such as the apparatus 100 of FIG. 1. Furthermore, it should be noted that at least some of the elements described below may not be mandatory and thus some may be omitted in certain embodiments.

The multi-band multi-feed antenna 600 comprises a first conductive end portion 602 that has a first antenna feed point 608 located in a substantially middle area of the first conductive end portion 602. The multi-band multi-feed antenna 600 further comprises a second conductive end portion 604 that has a second antenna feed point 610 located in a substantially middle area of the second conductive end portion 604. The multi-band multi-feed antenna 600 further comprises a conductive middle portion 606 that is configured between the first and second conductive end portions and has a ground plane 626. The multi-band multi-feed antenna 600 further comprises a first lower ground member 612 at a first corner area of the first conductive end portion 602. The first lower ground member 612 is configured to interconnect the first conductive end portion 602 and the ground plane 626 of the conductive middle portion 606. The multi-band multi-feed antenna 600 further comprises a second lower ground member 614 at a second corner area of the first conductive end portion 602. The second lower ground member 614 is configured to interconnect the first conductive end portion 602 and the ground plane 626 of the conductive middle portion 606. The first and second corner areas of the first conductive end portion 602 are longitudinally opposite.

The multi-band multi-feed antenna 600 further comprises a first switching member 616 that is configured to switch the interconnection provided by the first lower ground member 612 on and off. The multi-band multi-feed antenna 600 further comprises a second switching member 618 that is configured to switch the interconnection provided by the second lower ground member 614 on and off, such that only one of the interconnection provided by the first lower ground member 612 and the interconnection provided by the second lower ground member 614 is switched on at a time.

At least one of the first and second switching members 616, 618 may be configured to perform the switching based on at least one of proximity information, touch information and received signal quality information. At least one of the first antenna feed point 608 and the second antenna feed point 610 may comprise a long term evolution (LTE) antenna feed point. The long term evolution antenna feed point may comprise a long term evolution low band (LB) antenna feed point. At least one of the first and second switching members 616, 618 may comprise a single-pole single-throw (SPST) switch.

Figure 7:
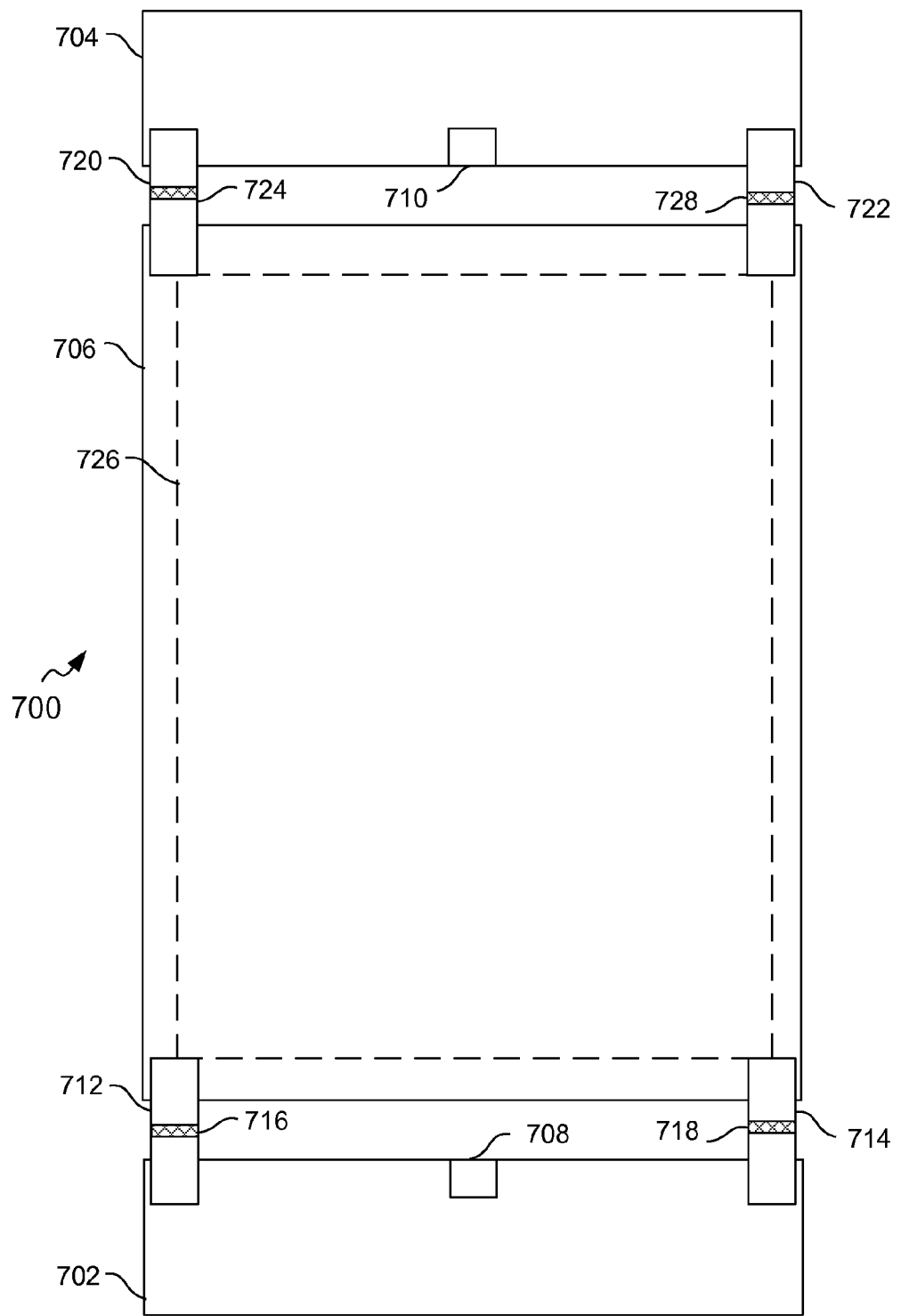
FIG. 7 illustrates an example block diagram of a multi-band multi-feed antenna in accordance with an example embodiment.

FIG. 7 illustrates a multi-band multi-feed antenna 700 in accordance with an example embodiment. The multi-band multi-feed antenna 700 may be employed, for example, in the apparatus 100 of FIG. 1. However, it should be noted that the antenna 700 may also be employed on a variety of other apparatuses, and therefore, embodiments should not be limited to application on apparatuses such as the apparatus 100 of FIG. 1. Furthermore, it should be noted that at least some of the elements described below may not be mandatory and thus some may be omitted in certain embodiments.

In the example of FIG. 7, the functionalities and locations of the first conductive end portion 702, the second conductive end portion 704, the conductive middle portion 706 and its ground plane 726, the first antenna feed point 708, the second antenna feed point 710, the first lower ground member 712, the second lower ground member 714, the first switching member 716, and the second switching member 718 are substantially similar to those of their counterparts in the example of FIG. 6, so their descriptions are not repeated here in detail.

In the example of FIG. 7, the multi-band multi-feed antenna 700 further comprises a first upper ground member 720 at a first corner area of the second conductive end portion 704 that is configured to interconnect the second conductive end portion 704 and the ground plane 726 of the conductive middle portion 706. The multi-band multi-feed antenna 700 further comprises a second upper ground member 722 at a second corner area of the second conductive end portion 704 that is configured to interconnect the second conductive end portion 704 and the ground plane 726 of the conductive middle portion 706. The first and second corner areas of the second conductive end portion 704 are longitudinally opposite. The multi-band multi-feed antenna 700 further comprises a third switching member 724 that is configured to switch the interconnection provided by the first upper ground member 720 on and off. The multi-band multi-feed antenna 700 further comprises a fourth switching member 728 that is configured to switch the interconnection provided by the second upper ground member 722 on and off. Only one of the interconnection provided by the first upper ground member 720 and the interconnection provided by the second upper ground member 722 is switched on at a time.

At least one of the first, second, third and fourth switching members 716, 718, 724, 728 may be configured to perform the switching based on at least one of proximity information, touch information and received signal quality information.

At least one of the first antenna feed point 708 and the second antenna feed point 710 may comprise a long term evolution (LTE) antenna feed point. The long term evolution antenna feed point may comprise a long term evolution low band (LB) antenna feed point.

Figure 8:
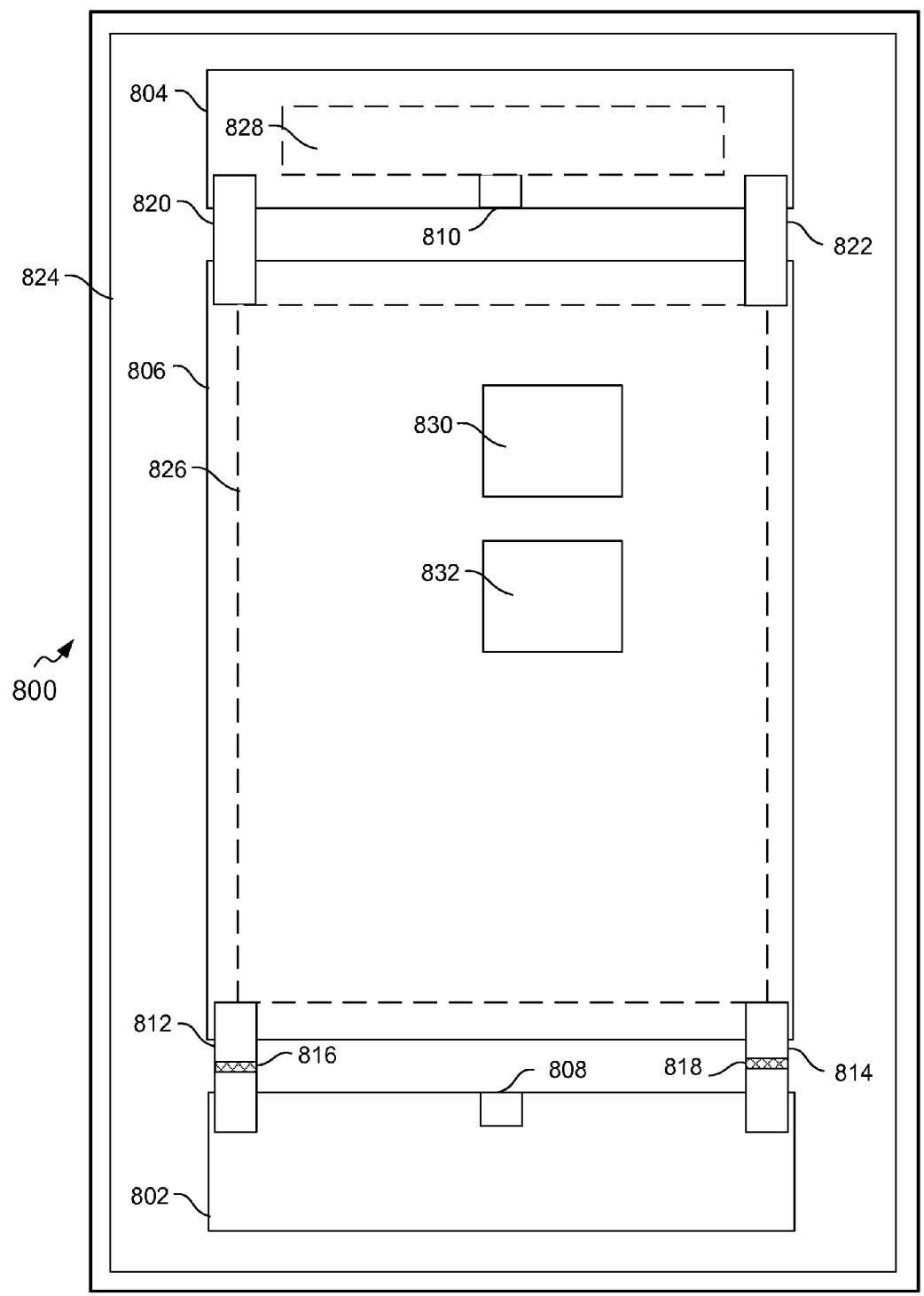
FIG. 8 illustrates an example block diagram of a wireless communication apparatus in accordance with an example embodiment.

FIG. 8 illustrates a wireless communication apparatus 800 in accordance with an example embodiment. The apparatus 800 may be employed, for example, in the apparatus 100 of FIG. 1. However, it should be noted that the apparatus 800 may also be employed on a variety of other apparatuses, and therefore, embodiments should not be limited to application on apparatuses such as the apparatus 100 of FIG. 1. Furthermore, it should be noted that at least some of the apparatuses or elements described below may not be mandatory and thus some may be omitted in certain embodiments.

The apparatus 800 may include at least one processor and at least one memory. Examples of the memory include, but are not limited to, volatile and/or non-volatile memories. For instance, the memory may comprise volatile memory (i.e., registers, cache, RAM), non-volatile memory (i.e., ROM, EEPROM, flash memory, etc.), or some combination of the two. The memory stores software, for example, processing instructions that can, for example, implement the technologies described herein, upon execution. For example, the memory may be configured to store information, data, applications, instructions or the like for enabling the device 800 to carry out various functions in accordance with various example embodiments.

An example of the processor may be the processor 102 of FIG. 1. The processor may be embodied in a number of different ways. In an embodiment, the processor may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

A user interface may be in communication with the processor. Examples of the user interface include, but are not limited to, an input interface and/or an output interface. Examples of the input interface may include, but are not limited to, a keyboard, a mouse, a joystick, a keypad, a touch screen, soft keys, a microphone, and the like. Examples of the output interface may include, but are not limited to, a display such as light emitting diode display, thin-film transistor (TFT) display, liquid crystal displays, active-matrix organic light-emitting diode (AMOLED) display, a speaker, ringers, vibrators, and the like. In an example embodiment, the processor may control at least some functions of one or more elements of the user interface, such as, for example, a speaker, ringer, microphone, display, and/or the like. The processor may be configured to control one or more functions of one or more elements of the user interface through computer program instructions, for example, software and/or firmware, stored on a memory, and/or the like, accessible to the processor.

The apparatus 800 comprises a first printed wiring board 826. The apparatus 800 further comprises an at least partially conductive (e.g. metal) cover member 824 that comprises a multi-band multi-feed antenna. The multi-band multi-feed antenna may include a multi-band multi-feed antenna similar to multi-band multi-feed antenna 200, 300, 400, 500, 600 and/or 700 of FIGS. 2-7.

The multi-band multi-feed antenna comprises a first conductive (e.g. metal) end portion 802 that has a first antenna feed point 808 located in a substantially middle area of the first conductive end portion 802. The multi-band multi-feed antenna further comprises a second conductive (e.g. metal) end portion 804 that has a second antenna feed point 810 located in a substantially middle area of the second conductive end portion 804. The multi-band multi-feed antenna further comprises a conductive (e.g. metal) middle portion 806 that is configured between the first and second conductive end portions 802, 804, and that covers the first printed wiring board 826 at least partially. The first printed wiring board 826 acts as a ground plane. The multi-band multi-feed antenna further comprises a first lower ground member 812 at a first corner area of the first conductive end portion 802 that is configured to interconnect the first conductive end portion 802 and the ground plane of the conductive middle portion 806. The multi-band multi-feed antenna further comprises a second upper ground member 822 at a second corner area of the second conductive end portion 804 that is configured to interconnect the second conductive end portion 804 and the ground plane of the conductive middle portion 806. The first lower ground member 812 and the second upper ground member 822 are configured at substantially diagonally opposite positions.

It is to be understood that while the first lower ground member 812 is illustrated to be located in the left corner area of the first conductive end portion 202 and the second upper ground member 822 is illustrated to be located in the right corner area of the second conductive end portion 804 in the example embodiment of FIG. 8, in another example embodiment the first lower ground member 812 may be located in the right corner area of the first conductive end portion 802 and the second upper ground member 822 may be located in the left corner area of the second conductive end portion 804, such that the first lower ground member 2812 and the second upper ground member 822 are still configured at substantially diagonally opposite positions.

The wireless communication apparatus 800 may optionally further comprise a second lower ground member 814 at a second corner area of the first conductive end portion 802 that is also configured to interconnect the first conductive end portion 802 and the ground plane of the conductive middle portion 806, such that the first and second corner areas of the first conductive end portion 802 are longitudinally opposite. The wireless communication apparatus 800 may optionally further comprise a first switching member 816 that is configured to switch the interconnection provided by the first lower ground member 812 on and off. The wireless communication apparatus 800 may optionally further comprise a second switching member 818 that is configured to switch the interconnection provided by the second lower ground member 814 on and off, such that only one of the interconnection provided by the first lower ground member 812 and the interconnection provided by the second lower ground member 814 is switched on at a time.

The wireless communication apparatus 800 may optionally further comprise one or more sensors 830 that may include at least one of a proximity sensor, a touch sensor and a received signal quality monitor. The wireless communication apparatus 800 may optionally further comprise a control unit 832 that is configured to control the first switching member 816 and the second switching member 818 based on information provided by the at least one of the proximity sensor, the touch sensor and the received signal quality monitor.

The wireless communication apparatus 800 may optionally further comprise a second printed wiring board 828 that is housed at least partially in or on the second conductive end portion 804. The second antenna feed point 810 may be further located between the second printed wiring board 828 and the second conductive end portion 804. E.g. camera(s), sensor(s), an earpiece, a speaker, and/or a near-field communications (NFC) antenna, and the like may be installed on the second printed wiring board 828.

At least one of the first antenna feed point 808 and the second antenna feed point 810 may comprise a long term evolution (LTE) antenna feed point. The long term evolution antenna feed point may comprise a long term evolution low band (LB) antenna feed point.

Computer executable instructions may be provided using any computer-readable media that is accessible by computing based devices. Computer-readable media may include, for example, computer storage media such as memory and communications media. Computer storage media, such as memory includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media is shown within the computing based devices it will be appreciated that the storage may be distributed or located remotely and accessed via a network or other communication link, for example by using a communication interface.

At least some of the examples disclosed in FIGS. 1-8 are able to provide reduction in antenna correlation (expressed e.g. by envelope correction coefficient, ECC) for LTE low bands in free space. As an effect of a short circuit at a corner, the LTE low bands radiation pattern is more directional. Ground members at diagonally opposite corners at first and second end portions allows the radiation patterns of LTE LB to point to substantially opposite directions. This may enhance the radiation pattern diversity effect.

At least some of the examples disclosed in FIGS. 1-8 are able to provide reduction of LTE LB hand effect. The LTE LB hand effect refers to over-the-air (OTA) radio frequency performance of LTE main and LTE MIMO antennas dropping at upper part of LTE low bands (substantially above 850 MHz) in hand-held use cases due to absorptive loss of hand which increases substantially when frequency rises towards 1 GHz. At least some of the examples disclosed in FIGS. 1-8 are able to allow switching the radiation pattern of a LTE LB antenna to essentially different directions according to need (such as left and right hand use cases) and thus reduce the loss caused by the hand. At least some of the examples disclosed in FIGS. 1-8 are able to allow utilizing Rx signal quality of suitably designed LTE MB/HB antenna feeds as a control signal for LB left/right selection switching.

At least some of the examples disclosed in FIGS. 1-8 are able to provide selection of operation modes of free space mode (ECC reduction) and hand loss reduction mode by switching according to use case and system needs.

An embodiment of a multi-band multi-feed antenna comprises a first conductive end portion having a first antenna feed point located in a substantially middle area of the first conductive end portion; a second conductive end portion having a second antenna feed point located in a substantially middle area of the second conductive end portion; a conductive middle portion configured between the first and second conductive end portions and having a ground plane; a first lower ground member at a first corner area of the first conductive end portion, configured to interconnect the first conductive end portion and the ground plane of the conductive middle portion; and a second upper ground member at a second corner area of the second conductive end portion, configured to interconnect the second conductive end portion and the ground plane of the conductive middle portion, wherein the first lower ground member and the second upper ground member are configured at substantially diagonally opposite positions.

In an embodiment, alternatively or in addition to the above described embodiments, the multi-band multi-feed antenna further comprises one or more ancillary antenna feed points.

In an embodiment, alternatively or in addition to the above described embodiments, at least one of the one or more ancillary antenna feed points is located in the substantially middle area of the second conductive end portion.

In an embodiment, alternatively or in addition to the above described embodiments, at least one of the one or more ancillary antenna feed points is integrated with the second upper ground member.

In an embodiment, alternatively or in addition to the above described embodiments, the second upper ground member comprises a frequency selective filter element.

In an embodiment, alternatively or in addition to the above described embodiments, at least one of the first antenna feed point and the second antenna feed point comprises a long term evolution antenna feed point.

In an embodiment, alternatively or in addition to the above described embodiments, the long term evolution antenna feed point comprises a long term evolution low band antenna feed point.

In an embodiment, alternatively or in addition to the above described embodiments, at least one of the one or more ancillary antenna feed points comprises a non-cellular wireless system antenna feed point.

In an embodiment, alternatively or in addition to the above described embodiments, the non-cellular wireless system comprises at least one of a wireless local area network system and a global positioning system.

In an embodiment, alternatively or in addition to the above described embodiments, at least one of the one or more ancillary antenna feed points comprises one of a long term evolution middle band antenna feed point and a long term evolution high band antenna feed point.

An embodiment of a multi-band multi-feed antenna comprises a first conductive end portion having a first antenna feed point located in a substantially middle area of the first conductive end portion; a second conductive end portion having a second antenna feed point located in a substantially middle area of the second conductive end portion; a conductive middle portion configured between the first and second conductive end portions and having a ground plane; a first lower ground member at a first corner area of the first conductive end portion, configured to interconnect the first conductive end portion and the ground plane of the conductive middle portion; a second lower ground member at a second corner area of the first conductive end portion, configured to interconnect the first conductive end portion and the ground plane of the conductive middle portion, the first and second corner areas of the first conductive end portion being longitudinally opposite; a first switching member configured to switch the interconnection provided by the first lower ground member on and off; and a second switching member configured to switch the interconnection provided by the second lower ground member on and off, wherein only one of the interconnection provided by the first lower ground member and the interconnection provided by the second lower ground member is switched on at a time.

In an embodiment, alternatively or in addition to the above described embodiments, the multi-band multi-feed antenna further comprises a first upper ground member at a first corner area of the second conductive end portion, configured to interconnect the second conductive end portion and the ground plane of the conductive middle portion; a second upper ground member at a second corner area of the second conductive end portion, configured to interconnect the second conductive end portion and the ground plane of the conductive middle portion, the first and second corner areas of the second conductive end portion being longitudinally opposite; a third switching member configured to switch the interconnection provided by the first upper ground member on and off; and a fourth switching member configured to switch the interconnection provided by the second upper ground member on and off, wherein only one of the interconnection provided by the first upper ground member and the interconnection provided by the second upper ground member is switched on at a time.

In an embodiment, alternatively or in addition to the above described embodiments, at least one of the first and second switching members is configured to perform the switching based on at least one of proximity information, touch information and received signal quality information.

In an embodiment, alternatively or in addition to the above described embodiments, at least one of the third and fourth switching members is configured to perform the switching based on at least one of proximity information, touch information and received signal quality information.

In an embodiment, alternatively or in addition to the above described embodiments, at least one of the first antenna feed point and the second antenna feed point comprises a long term evolution low band antenna feed point.

An embodiment of a wireless communication apparatus comprises a first printed wiring board; and an at least partially conductive cover member comprising a multi-band multi-feed antenna, wherein the multi-band multi-feed antenna comprises a first conductive end portion having a first antenna feed point located in a substantially middle area of the first conductive end portion; a second conductive end portion having a second antenna feed point located in a substantially middle area of the second conductive end portion; a conductive middle portion configured between the first and second conductive end portions, covering the first printed wiring board at least partially and having a ground plane; a first lower ground member at a first corner area of the first conductive end portion, configured to interconnect the first conductive end portion and the ground plane of the conductive middle portion; and a second upper ground member at a second corner area of the second conductive end portion, configured to interconnect the second conductive end portion and the ground plane of the conductive middle portion, wherein the first lower ground member and the second upper ground member are configured at substantially diagonally opposite positions.

In an embodiment, alternatively or in addition to the above described embodiments, the wireless communication apparatus further comprises a second lower ground member at a second corner area of the first conductive end portion, configured to interconnect the first conductive end portion and the ground plane of the conductive middle portion, the first and second corner areas of the first conductive end portion being longitudinally opposite; a first switching member configured to switch the interconnection provided by the first lower ground member on and off; and a second switching member configured to switch the interconnection provided by the second lower ground member on and off, wherein only one of the interconnection provided by the first lower ground member and the interconnection provided by the second lower ground member is switched on at a time.

In an embodiment, alternatively or in addition to the above described embodiments, the wireless communication apparatus further comprises at least one of a proximity sensor, a touch sensor and a received signal quality monitor; and a control unit configured to control the first switching member and the second switching member based on information provided by the at least one of the proximity sensor, the touch sensor and the received signal quality monitor.

In an embodiment, alternatively or in addition to the above described embodiments, the wireless communication apparatus further comprises a second printed wiring board housed at least partially in the second conductive end portion, wherein the second antenna feed point is further located between the second printed wiring board and the second conductive end portion.

In an embodiment, alternatively or in addition to the above described embodiments, at least one of the first antenna feed point and the second antenna feed point comprises a long term evolution low band antenna feed point.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include mobile telephones (including smart phones), tablet computers and many other devices.

The processes (e.g. at least some of the functions of the control unit 832 of FIG. 8) described herein may be performed by software in machine readable form on a tangible storage medium e.g. in the form of a computer program comprising computer program code means adapted to perform all the steps of any of the processes described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims, and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. A multi-band multi-feed antenna, comprising:
a first conductive end portion having a first antenna feed point located in a middle area of the first conductive end portion;
a second conductive end portion having a second antenna feed point located in a middle area of the second conductive end portion;
a conductive middle portion configured between the first and second conductive end portions and having a ground plane that is along a perimeter of a first side and an adjacent second side of the conductive middle portion;
a first lower ground member at a first corner area of the first conductive end portion, configured to interconnect the first conductive end portion and the ground plane of the conductive middle portion; and
a second upper ground member at a second corner area of the second conductive end portion, configured to interconnect the second conductive end portion and the ground plane of the conductive middle portion,
wherein the first lower ground member and the second upper ground member are configured at diagonally opposite positions.

2. The multi-band multi-feed antenna as claimed in claim 1,
further comprising one or more ancillary antenna feed points.

3. The multi-band multi-feed antenna as claimed in claim 2,
wherein at least one of the one or more ancillary antenna feed points is located in the middle area of the second conductive end portion.

4. The multi-band multi-feed antenna as claimed in claim 2, wherein at least one of the one or more ancillary antenna feed points is integrated with the second upper ground member.

5. The multi-band multi-feed antenna as claimed in claim 2, wherein at least one of the one or more ancillary antenna feed points comprises a non-cellular wireless system antenna feed point.

6. The multi-band multi-feed antenna as claimed in claim 5, wherein the non-cellular wireless system comprises at least one of a wireless local area network system and a global positioning system.

7. The multi-band multi-feed antenna as claimed in claim 2, wherein at least one of the one or more ancillary antenna feed points comprises one of a long term evolution middle band antenna feed point and a long term evolution high band antenna feed point.

8. The multi-band multi-feed antenna as claimed in claim 1, wherein the second upper ground member comprises a frequency selective filter element.

9. The multi-band multi-feed antenna as claimed in claim 1, wherein at least one of the first antenna feed point and the second antenna feed point comprises a long term evolution antenna feed point.

10. The multi-band multi-feed antenna as claimed in claim 9, wherein the long term evolution antenna feed point comprises a long term evolution low band antenna feed point.

11. A multi-band multi-feed antenna, comprising:
a first conductive end portion having a first antenna feed point located in a middle area of the first conductive end portion;
a second conductive end portion having a second antenna feed point located in a middle area of the second conductive end portion;
a conductive middle portion configured between the first and second conductive end portions and having a ground plane that is along a perimeter of a first side and an adjacent second side of the conductive middle portion;
a first lower ground member at a first corner area of the first conductive end portion, configured to interconnect the first conductive end portion and the ground plane of the conductive middle portion;
a second lower ground member at a second corner area of the first conductive end portion, configured to interconnect the first conductive end portion and the ground plane of the conductive middle portion, the first and second corner areas of the first conductive end portion being longitudinally opposite;
a first switching member configured to switch the interconnection provided by the first lower ground member on and off; and
a second switching member configured to switch the interconnection provided by the second lower ground member on and off,
wherein only one of the interconnection provided by the first lower ground member and the interconnection provided by the second lower ground member is switched on at a time.

12. The multi-band multi-feed antenna as claimed in claim 11, further comprising:
a first upper ground member at a first corner area of the second conductive end portion, configured to interconnect the second conductive end portion and the ground plane of the conductive middle portion;
a second upper ground member at a second corner area of the second conductive end portion, configured to interconnect the second conductive end portion and the ground plane of the conductive middle portion, the first and second corner areas of the second conductive end portion being longitudinally opposite;
a third switching member configured to switch the interconnection provided by the first upper ground member on and off; and
a fourth switching member configured to switch the interconnection provided by the second upper ground member on and off,
wherein only one of the interconnection provided by the first upper ground member and the interconnection provided by the second upper ground member is switched on at a time.

13. The multi-band multi-feed antenna as claimed in claim 12, wherein at least one of the third and fourth switching members is configured to perform the switching based on at least one of proximity information, touch information and received signal quality information.

14. The multi-band multi-feed antenna as claimed in claim 11, wherein at least one of the first and second switching members is configured to perform the switching based on at least one of proximity information, touch information and received signal quality information.

15. The multi-band multi-feed antenna as claimed in claim 11, wherein at least one of the first antenna feed point and the second antenna feed point comprises a long term evolution low band antenna feed point.

16. A wireless communication apparatus, comprising:
a first printed wiring board; and
an at least partially conductive cover member comprising a multi-band multi-feed antenna,
wherein the multi-band multi-feed antenna comprises:
a first conductive end portion having a first antenna feed point located in a middle area of the first conductive end portion;
a second conductive end portion having a second antenna feed point located in a middle area of the second conductive end portion;
a conductive middle portion configured between the first and second conductive end portions, covering the first printed wiring board at least partially and having a ground plane that is along a perimeter of a first side and an adjacent second side of the conductive middle portion;
a first lower ground member at a first corner area of the first conductive end portion, configured to interconnect the first conductive end portion and the ground plane of the conductive middle portion; and
a second upper ground member at a second corner area of the second conductive end portion, configured to interconnect the second conductive end portion and the ground plane of the conductive middle portion,
wherein the first lower ground member and the second upper ground member are configured at diagonally opposite positions.

17. The wireless communication apparatus as claimed in claim 16, further comprising:
a second lower ground member at a second corner area of the first conductive end portion, configured to interconnect the first conductive end portion and the ground plane of the conductive middle portion, the first and second corner areas of the first conductive end portion being longitudinally opposite;
a first switching member configured to switch the interconnection provided by the first lower ground member on and off; and
a second switching member configured to switch the interconnection provided by the second lower ground member on and off,
wherein only one of the interconnection provided by the first lower ground member and the interconnection provided by the second lower ground member is switched on at a time.

18. The wireless communication apparatus as claimed in claim 16, further comprising:
at least one of a proximity sensor, a touch sensor and a received signal quality monitor; and
a control unit configured to control the first switching member and the second switching member based on information provided by the at least one of the proximity sensor, the touch sensor and the received signal quality monitor.

19. The wireless communication apparatus as claimed in claim 16, further comprising a second printed wiring board housed at least partially in the second conductive end portion, wherein the second antenna feed point is further located between the second printed wiring board and the second conductive end portion.

20. The wireless communication apparatus as claimed in claim 16, wherein the conductive middle portion further comprises a third side opposite the first side and a fourth side opposite the second side, wherein ground plane extends along a perimeter of the first side, second side, third side, and fourth side of the conductive middle portion.

* * * * *